United States Patent [19]

Boone et al.

[11] 4,034,623
[45] July 12, 1977

[54] FOLDING MECHANISM FOR HINGED IMPLEMENT FRAME EXTENSIONS

[75] Inventors: James A. Boone; Galen R. Huffman; Galen L. Neher, all of Quinter, Kans.

[73] Assignee: Ideal Industries, Inc., Quinter, Kans.

[21] Appl. No.: 442,067

[22] Filed: Feb. 13, 1974

[51] Int. Cl.² .......................................... G05G 1/04
[52] U.S. Cl. ................................. 74/522; 56/228; 172/240
[58] Field of Search ............ 56/228; 172/240, 311, 172/456; 74/522, 110, 512

[56] References Cited

U.S. PATENT DOCUMENTS

| | | | |
|---|---|---|---|
| 3,027,778 | 4/1962 | Risnes | 74/512 |
| 3,791,673 | 2/1974 | Hornung | 172/456 |
| 3,797,580 | 3/1974 | Roth | 172/311 |

Primary Examiner—Samuel Scott
Assistant Examiner—Wesley S. Ratliff, Jr.
Attorney, Agent, or Firm—Edwin L. Spangler, Jr.

[57] ABSTRACT

This invention relates to a hydraulic servomotor-actuated folding mechanism for swinging the hinged extension of an implement frame horizontally between an extended and a retracted position characterized by a two-part foldable strut, the adjacent ends of its sections being hingedly interconnected for pivotal movement, a first link connected between the piston rod of the servomotor and the foldable strut section, and a second link pivotally connected to the main strut section at a point displaced from the pivotal connection between its sections, said second link having its other end connected to the first link at a point intermediate its ends so as to cooperate therewith and with the strut sections to define a pair of fixed length lever arms movable upon actuation between a crossed relation and a side-by-side relation to effect folding and unfolding of the strut.

8 Claims, 5 Drawing Figures

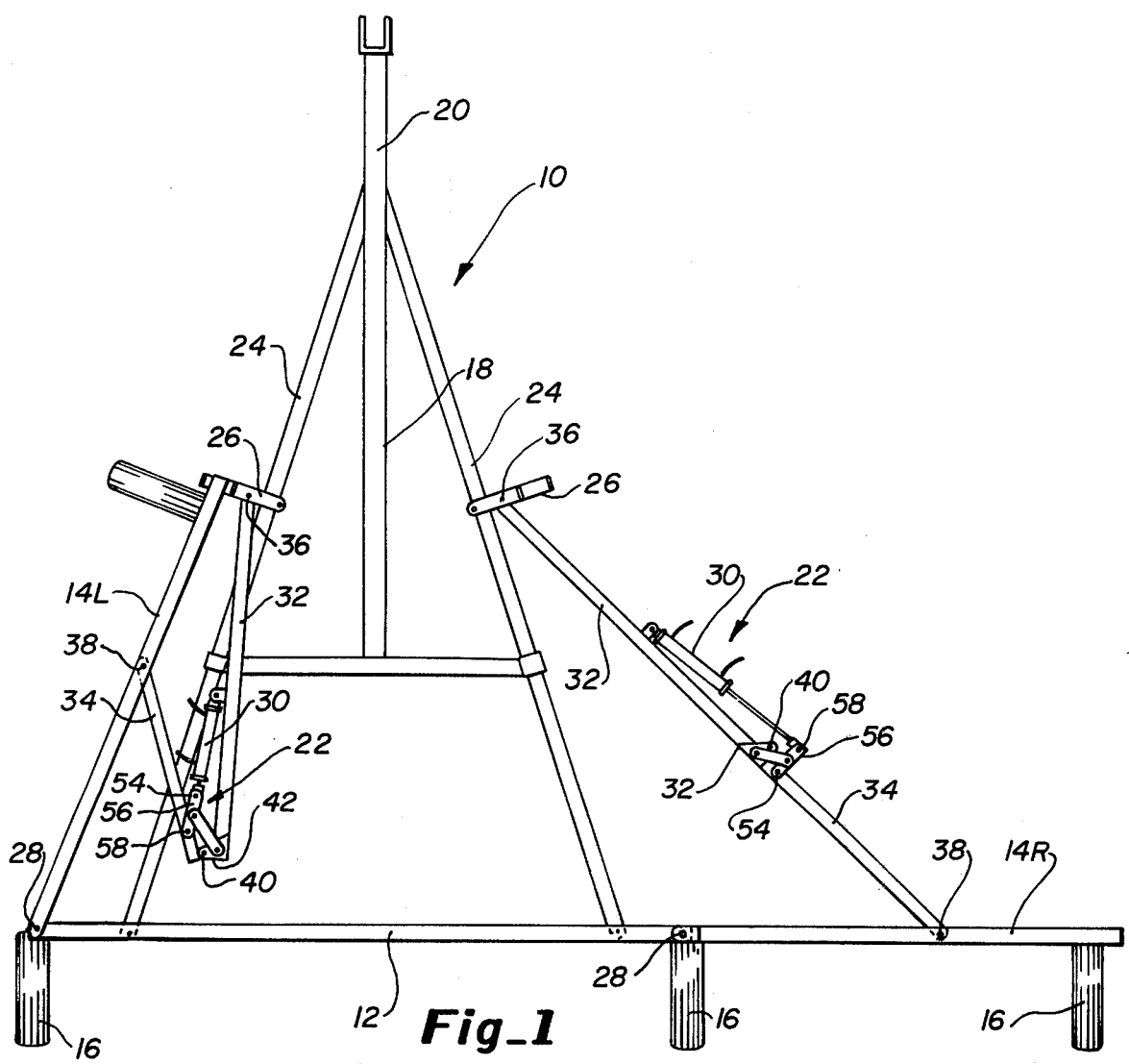
Fig_1
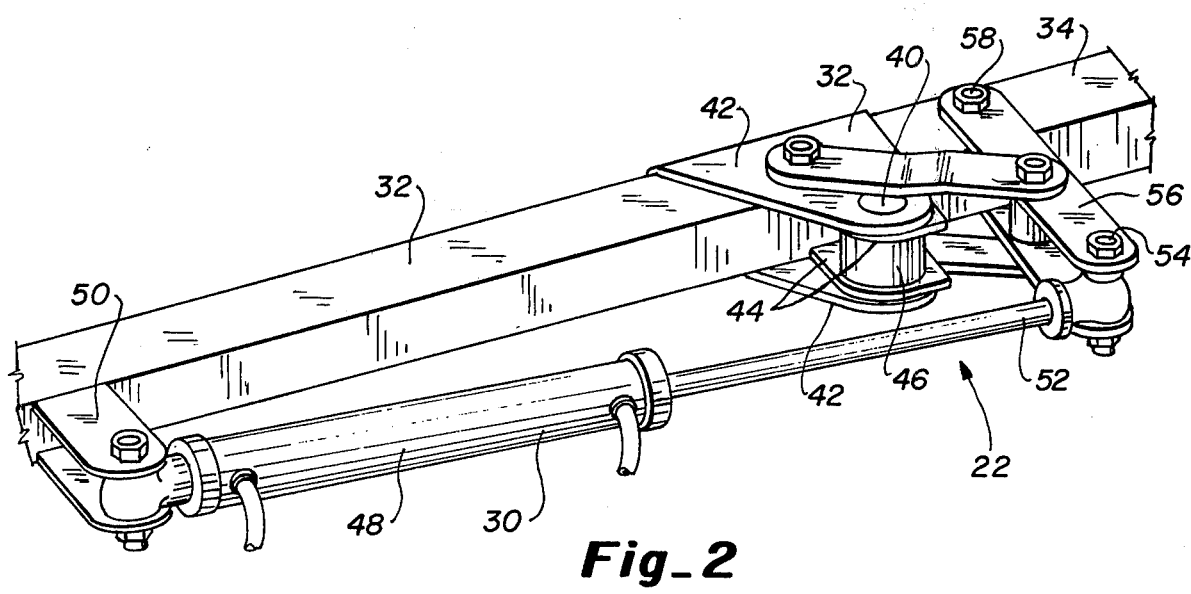
Fig_2

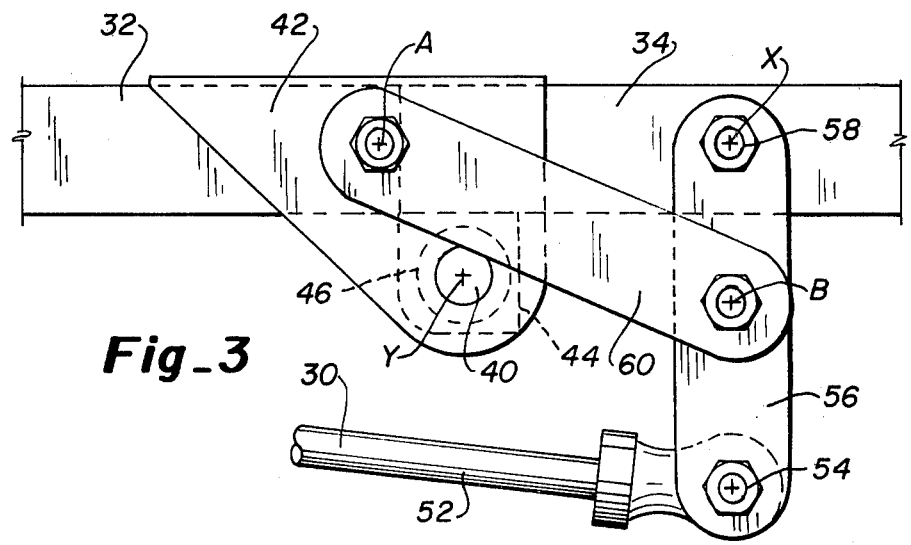
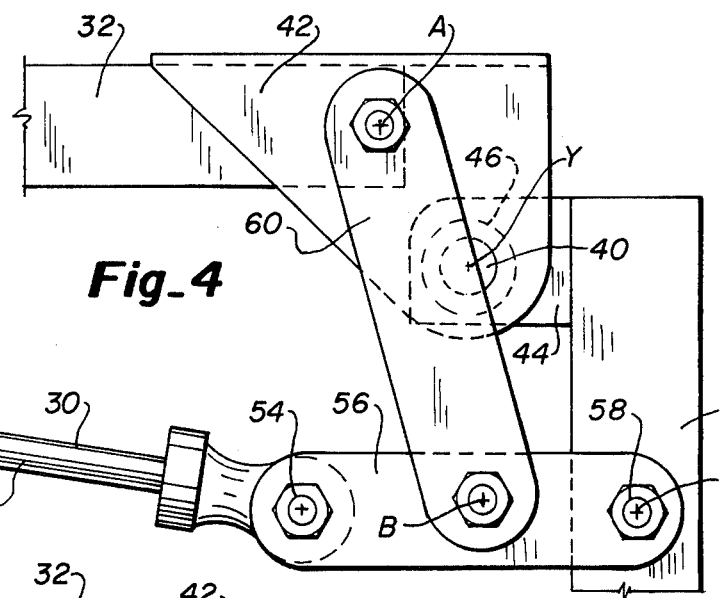
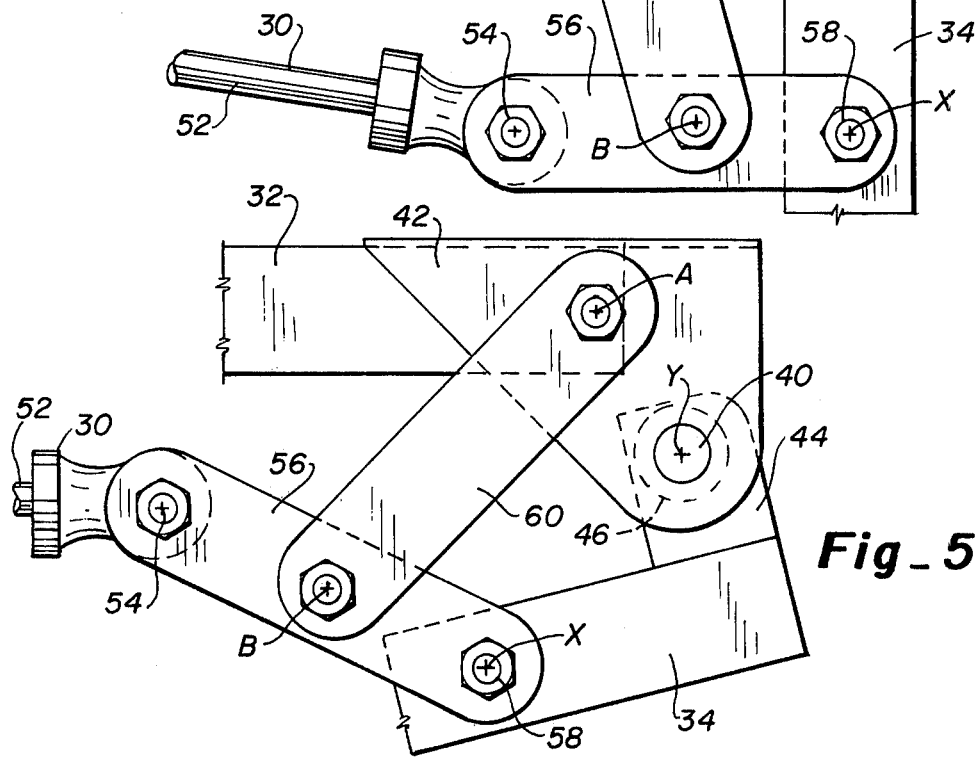

FOLDING MECHANISM FOR HINGED IMPLEMENT FRAME EXTENSIONS

Ground-tillage implements are being made larger and wider as time goes on, so wide in fact, that they cannot be moved from one field to another along the highway unless provided with some type of hinged frame or completely detachable outboard extensions. In the case of the latter solution to the problem, "ganged" assemblies are only practical when no power is supplied to elements of the gang from the tractor or other towing vehicle. If, however, as is most often the case, each element of the assembly requires connection to a source of power, it becomes more practical to disconnect the various hydraulic couplings as well as to unhitch the element itself from whatever it is hitched to. By far the better solution in this situation is, therefore, the foldable frame with hinged extensions that can be swung out of the way for both highway transport and to get the unit through narrow gates and doorways.

Hinged implement frames are widely known and have been in use for many years on gang mowers and other equally commonplace farm machines; however, mowers and other harvesting machines working above ground are usually a good deal lighter than comparable cultivating equipment that operates below ground level and must, therefore, rely upon its considerable weight to achieve good penetration. When ground-tillage machines get large, they also get so heavy that the customary mechanisms for swinging these extensions to and fro out of the way are no longer adequate. Since the basic sources of power available from the tractor or other towing vehicle are, customarily, confined to a direct mechanical drive commonly known as the "power take-off" and a source of hydraulic fluid under pressure, the types of folding mechanisms available are somewhat limited. Furthermore, the mechanical drive is seldom, if ever, used for extending and retracting the hinged extensions on the implement frame thus, as a practical matter, one is left with only the hydraulic power source to operate the extensions.

When dealing with hydraulic power, the most obvious drive is some kind of piston-actuated servomotor of either the single or double-acting type. At this point, however, significant problems arise in applying this solution to the movement of a hinged implement frame extension which may project beyond the main frame to which it is hingedly connected as much as ten to fifteen feet while weighing upwards of a thousand pounds and more. For instance, any direct pull or push applied at a considerable distance from the hinge axis requires an exceedingly long-stroke cylinder which is both expensive and bulky. Conversely, mounting the servomotor in close to the hinge reduces its length but requires it to develop a great deal more power. Also, the speed at which the portions of the extension remote from the hinge move is multiplied severalfold thus creating a hazardous condition for personnel that is most unsafe as well as being shakey and rather unstable. Furthermore, using the servomotor as the operating link effecting a direct connection between a fixed portion of the main frame and an extension hingedly connected thereto creates many mechanical problems that do not admit to an easy solution such as, for example, excessive space requirements, oversize subassemblies, limitations on the extent of angular movement, lengthy hoses, remotely-located hose couplings, etc.

It has now been found in accordance with the teaching of the instant invention that these and other shortcomings of the prior art mechanisms for extending and retracting the hinged extensions an implement frame can, in large measure, be eliminated by the simple, but unobvious expedient of connecting such extension to a fixed part of the main frame by a two-part foldable strut and using a hydraulic servomotor connected to one of the sections of the strut to actuate the other section thereof between its folded and unfolded positions through the medium of a novel crossover linkage. The resulting assembly is small, compact and relatively inexpensive while, at the same time, providing adequate power to swing a heavy frame extension along with the implement carried thereby slowly and smoothly between its retracted and extended positons. By positioning the entire mechanism inside the angle in the folded strut rather than outside, the resulting assembly is much more compact and better protected from damage than the more common external mounting. Also, the location of the assembly is such that the hose couplings are readily accessible and the hoses themselves are relatively short and out of the way. Furthermore, the linkage employed is such that essentially straight-line motion of the piston rod in the hydraulic servomotor is translated into arcuate movement that may exceed 180°.

Accordingly, it is the principal object of the present invention to provide a novel and improved mechanism for folding implement frame extensions and the like.

A second objective is the provision of a device of the class described which is compact yet powerful enough to both extend and retract heavy implement frame extensions slowly and easily.

Another object is to provide a unit of the type herein disclosed and claimed that readily integrates into the hydraulic accessory power supply of the tractor or other towing vehicle.

Still another objective is the provision of a hydraulically-operated frame extension retractor that is located within the angle of a foldable strut so as to reduce the space requirements and also to protect same.

An additional objective of the within described invention is the provision of a servomotor-actuated foldable strut assembly that translates essentially linear motion to angular motion through an angle well in excess of 180°.

Further objects are to provide a hydraulically-operated foldable strut lift which is simple, inexpensive, rugged, reliable, easy to service and maintain, dependable, efficient, versatile and safe.

Other objects will be in part apparent and in part pointed out specifically hereinafter in connection with the description of the drawings that follows, and in which:

FIG. 1 is a rear elevation showing the foldable strut of the present invention connected between the center section and hinged extensions of a wheeled implement frame;

FIG. 2 is a greatly enlarged fragmentary perspective view of the "joint" in the foldable strut showing the hydraulic servomotor, crossover linkage and pivot located between its hingedly interconnected sections as seen from a point above and to one side thereof;

FIG. 3 is a still further enlarged fragmentary top plan view showing the linkage extended into crossed relation so as to place the sections of the strut in alignment with one another;

FIG. 4 is a top plan view like FIG. 3 except that the strut is shown actuated into partially folded right angle relation; and, FIG. 5 is still another top plan view like FIGS. 3 and 4 and to the same scale showing the strut is fully folded condition as the linkage assumes its side-by-side relation.

Referring next to the drawings for a detailed description of the present invention, reference numeral 10 has been employed to broadly designate an implement frame representative of the general type having a center section 12 to which are hingedly attached a pair of outboard extensions 14R and 14L. These extensions swing more or less horizontally between the extended position shown on the right in FIG. 1 and the retracted position shown on the left. The center section of the frame is supported on wheels 16 as are the extensions. A yoke subassembly 18 including a tongue 20 for attachment to a towing vehicle projects forwardly from the center section 12 and defines the fixed points of attachment for the extension folding subassembly forming the subject matter of the instant invention and which has been designated broadly by reference numeral 22. The angled braces 24 together with the brackets 26 depending therefrom receive the frame extensions in retracted position as shown and provide the means for locking them out of the way.

When the extensions swing about their vertically-disposed axes of pivotal movement defined by hinge pins 28, they roll over the ground on the wheels 16 journalled for rotation at their outboard ends thus reducing the power required in servomotor 30 to a fraction of that needed to lift same. Since the servomotors are working on both their extension and retraction strokes due to the fact that gravity will not shift the extensions in either direction, double-acting servomotors are required. Once the extensions are folded into the fully retracted position of lefthand extension 14L and latched in place to the brackets 26 of the yoke subassembly, the tongue 20 can be elevated to lift the outboard wheels free of the ground using the inboard wheels on the center section as fulcrums.

No attempt has been made to detail the implement frame as it is intended as being merely representative of one such frame selected from the general class of hinged implement frames well known in the art. Futhermore, no implement at all has been shown carried by the frame, it being understood that such could, without the exercise of more than ordinary mechanical skill, be fitted with various types of ground-tillage implements, harvesters and, perhaps, even balers and the like.

Next, with particular reference to the remaining figures of the drawings, specifically, FIGS. 2–5, inclusive, the foldable strut subassembly including the actuating mechanism therefor will now be set forth in detail. For purposes of differentiating between the two sections of the strut, the longer section attached to the yoke subassembly will henceforth, be referred to as the "main section" 32 while the shorter one will be designated the "foldable section" 34, it being understood that under some circumstances the relative lengths thereof could well be the same or even be reversed depending upon the location of the point of attachment of the main section to the fixed frame 24. Of course, as the main section is shortened, the arc through which the extension may swing before reaching the fully-folded condition of extension 14L is correspondingly reduced. Note also that substitution of a servomotor 30 with a longer stroke would enable the strut to unfold to an angular relation approaching 270° should the need arise and it is, therefore, by no means limited to the 180° unfolded relation shown. Again with reference to FIG. 1, it can be seen that the remote end of each main section 32 is pivotally attached to a portion of the fixed frame, such connection having been shown at bracket 26 and identified by reference numeral 36. The remote end of the foldable section 34 is similarly attached to the frame extension 14 in spaced relation to its axis of pivotal movement 28, such point of attachment having been indicated by reference numeral 38 in the same figures.

The adjacent ends of the strut sections on the other hand, are hingedly interconnected for movement about a laterally-offset pivot 40 carried between brackets 42 attached to main section 32 that are much more clearly revealed in FIGS. 2–5 to which reference will, once again, be made. These brackets 42 project beyond the adjacent end of main section 32 and the foldable section 34 is received therebetween a shown. Ears 44 project laterally from the adjacent end of the foldable section along the inside faces of brackets 42 where they pivotally mount on pivot pin 40 extending therebetween. Bushing 46 defines a spacer between ears 44 as well as the journal for section 34 on pivot 40.

The cylinder 48 of servomotor 30 is pivotally attached to clevis 50 depending from the main section in spaced relation to its adjacent end and projecting onto the same side thereof as brackets 42. The piston rod 52 of the servomotor, on the other hand, is pivotally connected at 54 to one end of a first link 56 while the opposite end of the latter is similarly attached to foldable arm 34 for pivotal movement about an axis "X" defined by pivot 58. Actually, a pair of so-called "first" links 56 are used occupying a spaced parallel relation to each other and cooperating to define bifurcated end portions, one of which receives the free end of the piston rod therebetween while the other embraces the foldable strut section 34.

A second pair of parallel links 60 connected between the main strut section 32 and a point intermediate the ends of connecting links 56 define a tiltable fulcrum for the latter to rock upon through a limited angle as the foldable strut section moves from its fully extended position of FIGS. 2 and 3 into its fully retracted position of FIG. 5. Links 60 have one end mounted on a pivot 62 attached to the main strut section 32 that defines an axis "A" while the other ends are mounted on a pivot 64 carried by the connecting links 56 that defines axis "B". Pivot 40 locates an axis "Y" which remains fixed in relation to both axes "A" and "X". At this point it should be noted that while pivot pin 40 and the axis "Y" defined thereby has been shown displaced laterally to one side of the strut sections, the significant factor in the operation of the linkage is that axes "A" and "Y" be displaced from one another and thus not be coincident. In fact, the linkage will work just the same if axis "Y" and its pivot 40 were to be moved back in line with the strut sections, the disadvantages being that the sections would not fold up as tightly and still leave space enough to accommodate the servomotor therebetween.

The key to operation of the linkage interconnecting the main and foldable sections of the strut lies in recognizing the fact that the fixed length lever arms A–B and X–Y move from a crossed relation in fully extended position to a side-by-side relation in retracted position as is clearly revealed by comparing the locations of these several axes in FIGS. 3 and 5. In fact, while the mechanical limitations of the specific embodiment of the present invention illustrated in FIGS. 1-5, inclusive, prevent the foldable strut section from swinging through an arc of even a full 180°, the linkage itself is by no means so and it can, in fact, make a complete 360° excursion. In so doing, it will pass through two different triangular configurations. The first of these is the one in which axes Y, X and B are aligned to define one leg of the triangle whose other legs are A-Y and A-B, respectively. This relationship can be visualized quite readily in FIG. 3 by moving axis B and X upwardly around their respective axes A and Y until the above relationship exists. Similarly, the second triangular relationship is the one in which axes B, X and Y are again aligned but on the opposite side of Y. Looking at FIG. 5, this relationship comes about when axes B and X are swung upwardly and to the left about their pivots A and Y respectively. Note also, that leg B-X-Y in FIG. 5 is not an extension of leg Y-X-B extending to the right of axis Y in FIG. 3. This means, of course, that the linkage could be used to swing an arm 34 around a pivot 40 with unidirectional actuation between the above-described straight-line limits B-X-Y and Y-B-X to accomplish an excursion through nearly a 270° arc. The term "unidirectional" in the preceding sentence is intended to distinguish over the circular "cranking" action which includes both "push" and "pull" components necessary to move the linkage over center and actuate it.

What is claimed is:

1. The foldable strut assembly connectable between the hingedly interconnected elements of an implement frame for moving same between an extended and a retracted position which comprise: first and second strut sections having the adjacent ends thereof hingedly connected for movement between a folded and an unfolded position; drive means including a linear actuator fastened to one of said first and second strut sections within the angle formed therebetween the folded position; a first link interconnecting the linear actuator with the other of said first and second strut sections at a point spaced from the hinged connection therebetween; and, a second link interconnecting a point intermediate the ends of the first link with said one strut section at a point remote from the hinged connection therebetween; said hinged connection between the strut sections cooperating with the connection of the links to the latter and to one another to define a pair of lever arms movable upon actuation of the drive means from a crossed relation in the extended position of the strut to a side-by-side relation in the folded position thereof.

2. The foldable strut assembly as set forth in claim 1 in which: the drive means comprises a double acting hydraulic servomotor.

3. The foldable strut assembly as set forth in claim 1 in which: the hinged connection between the first and second strut sections is laterally offset therefrom to define a gap therebetween in folded position sized to accept the drive means.

4. The foldable strut assembly as set forth in claim 1 in which: one lever arm is defined by the second link and the second lever arm is defined by the hinged connection between the strut sections and the pivotal connection between the first link and the latter.

5. The foldable strut assembly as set forth in claim 1 in which: the pivotal connection of both links with the strut sections are aligned therewith while the hinged connection therebetween is laterally offset to one side thereof.

6. The foldable strut assembly as set forth in claim 1 in which: the second link defines a tiltable fulcrum for the first link to rock upon as the latter swings in an arc about the axis defined by the hinged connection.

7. The foldable strut assembly as set forth in claim 3 in which: the hinged connection is laterally offset toward the fold.

8. The foldable strut assembly as set forth in claim 5 in which: the hinged connection is laterally offset toward the fold.

* * * * *